Nov. 14, 1950 W. M. DEVERS 2,530,232

METHOD OF PREPARING INTAGLIO PRINTING SURFACES

Filed Nov. 20, 1945

INVENTOR.
WILLIAM M. DEVERS
BY
Hoguet, Neary & Campbell
his ATTORNEYS

Patented Nov. 14, 1950

2,530,232

UNITED STATES PATENT OFFICE 2,530,232

METHOD OF PREPARING INTAGLIO PRINTING SURFACES

William M. Devers, Springfield, Ohio

Application November 20, 1945, Serial No. 629,749

13 Claims. (Cl. 95—5)

This invention relates to the art of intaglio printing and more especially to that part of the intaglio printing art having to do with the preparation of the intaglio printing surface and to the intaglio printing surface itself.

More especially, the invention embodies an improved intaglio printing surface and photo-engraving process for preparing the same as well as certain improved products utilized during the manufacture thereof.

In the manufacture of intaglio printing surfaces, it has heretofore been common practice to expose a carbon tissue or other suitable resist to a continuous tone positive of the subject to be reproduced, expose the carbon tissue to a gravure screen (transparent cross lines), apply the carbon tissue to a copper or other suitable printing surface, develop, and then etch. The screen lines preserve the original surface of the copper, and the spaces between the lines are hardened in proportion to the amount of light striking them through the positive so that, where much light falls, the etching medium eats away only a small amount of copper, whereas, where very little light falls, the resist is less effective and thereby holds back the etching action less, and relatively deep pockets are formed. The shallow pockets hold comparatively little ink, and thus print the light tones, whereas the deep pockets hold a large amount of ink and print the heavy tones. Intermediate tones are reproduced by pockets of corresponding depth. In this method, great care must be exercised in etching the pockets of varying depth to insure that accurate tone reproduction is achieved.

Another method in common use is to form two positive transparencies of the subject to be reproduced, one a continuous tone positive transparency, and the other, a positive in which the image is broken up into a screen formation by means of a half-tone screen so that the positive image is formed of a multiplicity of dots, varying in size in accordance with the tones of the subject. In exposing the positive through the screen, the spacing of the screen from the positive, and the time of exposure are both less than that ordinarily required to produce a half-tone image and are such as to form dots in the shadow tone areas which are not connected, so that, in the printing surface, the pockets will not run together but will all be discreet pockets. These two positive transparencies are then separately exposed onto the carbon tissue; the tissue transferred to the printing surface; developed; and the surface etched in accordance with known etching procedure.

In the second mentioned method, the screen formation of the screened positive transparency is reproduced in negative on the carbon tissue so that the opaque dots of the positive are reversed to non-resistant dots of the light sensitive gelatin, and the exposure of the continuous tone positive hardens these dots in proportion to the light intensity of the corresponding areas of the subject and thus produce areas permeable by the etching medium in varying degrees so that, when etched, the printing surface is formed with disconnected pockets not only varying in area, but also in depth.

In accordance with the present invention, the printing surface is formed with disconnected pockets varying both in size and depth in accordance with the tones of the original subject, but wherein the printing properties of the surface are greatly enhanced, and one object of the invention is to provide an improved method of forming intaglio printing surfaces photographically and by etching.

Another object of the invention is to provide an improved method of forming screened positive transparencies for use in the manufacture of intaglio printing surfaces.

Yet another object is to provide an improved intaglio printing surface.

Another object of the invention is to provide an improved screened positive transparency for use in the manufacture of intaglio printing surfaces.

A further object of the invention is to provide a screened positive and method of forming an intaglio printing surface wherein only one positive photographic image is required, that one positive being a screened positive having particular characteristics.

The foregoing objects are attained by utilizing a positive formed through a screen in a manner similar to that described in the second of the two known methods hereinabove referred to, and by treating it in such fashion as to bleach out certain areas of the respective dots and then re-developing with a developing solution having the properties of dyeing the bleached portions of the dots. Subsequent use of this modified positive, hereinafter referred to as a correlated positive, involves the steps of exposure to a carbon tissue, transferring to the printing surface, developing, and etching, all in accordance with known methods.

The specific manner in which the invention may be utilized will now be described in greater detail in connection with the accompanying drawings, wherein Figure 1 is a plan view of a typical subject to be reproduced, in this illustration being a tone wedge in which the tones extend from black to white;

It will be understood, at the outset, that this invention is adapted for use not only in the reproduction of subjects in one color (black, for example), but also in the reproduction of subjects in more than one color (such, for example, as yellow, red, blue and black in varying proportions to give substantially a full range of colors).

Where the reproduction is to be accomplished in multicolor, the subject is photographed through the proper color filters to obtain the desired color separation negatives. Having obtained these negatives (which may be corrected as desired in accordance with known practice), the subsequent operations are the same regardless of the particular color printing surface being prepared.

Figure 1:

Starting, for example, with a subject 1 (Figure 1) to be reproduced, it is first photographed to produce a negative (not illustrated) which may be, as above stated, a negative representing all the tones of the subject if the subject is not in multicolor, or, if the subject is in multicolor, the negative may be of any of the colors thereof and hence termed a separation negative. This negative may be re-touched or otherwise corrected, all in accordance with known practice.

From the negative above described, a positive transparency 2 (Figure 2) is made through a screen. In this operation, a half-tone screen may be used, and in making the exposure the spacing of the screen from the light sensitized surface and the exposure are both somewhat less than that required for making an ordinary half-tone exposure, other conditions being equal. This is common practice and is described, for example, in the patent to Ballard No. 2,024,087. The dot formation on the screened positive is one in which the smallest dot 3 corresponds in position to the lightest tones of the original subject, whereas the largest dot 4 corresponds in position to the darkest portion of the original subject. All intervening tones between these extremes are reproduced as dots of correspondingly varying sizes. It will be understood that a great number of dots will appear in the area of each tone, and that the single dots in Figure 2 represent the various tones of Figure 1 for illustrative purposes only.

Figure 2:
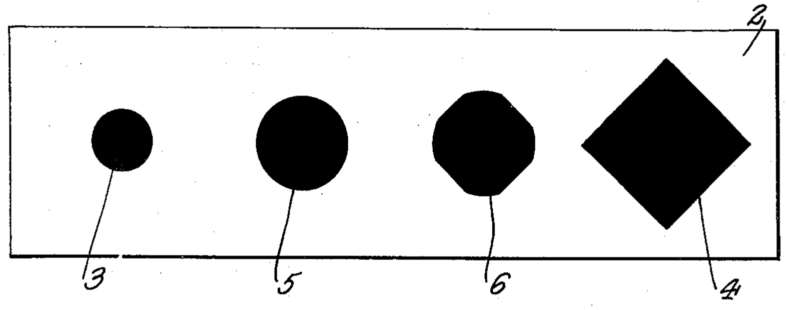
Figure 2 is a plan view, greatly enlarged, of a portion of a screened positive transparency typical of that formed from a wedge of tones extending from a full high light (white) to the deepest shadows (black) such, for example, as seen in Figure 1.

As the size of the dots of Figure 2 increases to a darker tone, they will appear as at 5 and then, as the tone continues to darken, the dots begin to assume the shape of square dots having rounded corners, as shown at 6 in Figure 2. The largest of the discreet dots will be square with the adjacent corners of the respective dots touching or almost touching. In actual practice, the number of different sized dots will be considerably greater from that illustrated in Figure 2.

In accordance with the present invention, the screened positive transparency illustrated in Figure 2 is next treated in a unique fashion in the following manner. The screened positive transparency is subjected to a bleaching medium such as, for example, a composition composed of potassium bromide, potassium ferricyanide, and water. Such a bleaching composition is available commercially, and an example of one such composition, the component parts of which are sold by Eastman Kodak Company and other photographic chemical suppliers, is identified as part A of Eastman Kodak Company's Sulfide Toner formula T-10. A typical composition consists of ½ oz. potassium bromide, 1 oz. potassium ferricyanide, and 32 oz. water. The bleaching operation is only partial and is carried on for a sufficient time to permit only the peripheries of the larger dots to be bleached. In a typical example this bleaching operation is carried on for 60 seconds, following which operation the screened positive is washed to clear the bleaching solution therefrom. Following the washing operation and in accordance with the present invention, the positive is next re-developed, and such re-development is accomplished by means of a developing solution which will impart a colored effect to the areas of the dots that have been bleached in the preceding operation. An example of a developing solution for this purpose is a magenta coupler developing solution prepared in accordance with commercial instructions and employed at half strength.

The magenta coupler developer converts the bleached portions of the dots which carried a black silver image into one of partial color which, in the case of the magenta developer, is magenta. As a result of this re-development, the positive shown in Figure 2 takes the form of that shown in Figure 3 of the drawings. The dot 3 of Figure 2 has now become the dot 3*a* of Figure 3 which, by hatching lines, is intended to illustrate a dot that has been bleached over its entire area and re-developed so that its entire area is colored.

Figure 3:
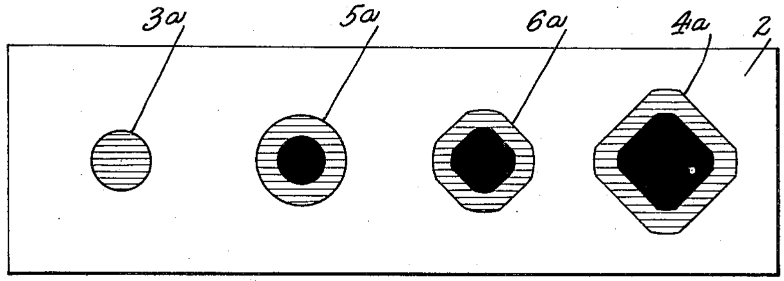
Figure 3 is a plan view of a modified or correlated positive made from the positive of Figure 2 in accordance with the present invention.

The dot 5 now becomes 5*a* of Figure 3 in which the peripheral portions which were bleached and re-developed now appear as a fringe of color about a substantially opaque center. The dot 6 of Figure 2 has become the dot 6*a* of Figure 3 again showing the fringe of color indicated by the hatching. The dot 4 of Figure 2 has become dot 4*a* of Figure 3, also having the fringe of color as previously mentioned.

It will be understood that the size of the opaque center in any dot depends upon the extent to which the bleaching operation is carried out, and this becomes an important control in practicing the present invention. Ordinarily, the bleaching operation is carried on until the opaque centers of the smallest, or relatively small dots, are lost. It has been found that the bleaching operation can be carried on from 30 seconds to 1½ minutes with good results.

In a typical operation, the time of redevelopment has been varied from 20 seconds to 100 seconds and numerous examples have been produced quite satisfactorily with a 45 second duration of the re-development operation.

In like manner, if the re-development operation is carried too far, the bleached portion of the dot becomes colored so fully that it blends into the opaque center, and the entire dot may thus become substantially opaque. In such event, the colored portion may be reduced as, for example, by means of a 5% solution of hydrochloric acid.

Following the re-development, the positive transparency is washed and then subjected to what might be termed a clearing operation. This operation removes any metallic silver that may remain in the colored fringe of the dot image and is accomplished by means of a reducer of known form. For example, "Farmer's Reducer," the ingredients of which (sodium thiosulphate and potassium ferricyanide) are available commercially, may be used for this purpose. An example of the use of such a reducer is as follows. Two solutions are first made, one of hypo and water in the proportion of 16 oz. hypo to 64 oz. water, and the other of potassium ferricyanide and water in the proportion of 16 oz. water to 1¼ oz. potassium ferricyanide. A composition consisting of 1 oz. of the potassium ferricyanide solution with 4 oz. of the hypo solution and 27 oz. water is then made, and this composition is used for clearing the positive transparency above referred to. When the screened positive is subjected to this clearing operation, a prolonged treatment reduces the opacity and size of the opaque center of the dot, resulting in creating a light halation around the center. This result is to be avoided and, in a typical operation, it has been found that the clearing can be carried on satisfactorily from about 30 to about 100 seconds. It has been found that 45 seconds is quite satisfactory for the duration of the clearing operation with the formula hereinabove referred to, but it will be apparent that the formula may be varied and correspondingly, the time of treatment in the clearing operation.

It is to be understood that an important advantage that may be secured by my improved process lies in the fact that the bleaching operation may be so carried out that the opaque centers of the dots may vary in density, the centers of the largest dots being most dense and those of the smaller ones decreasing in density as the size of the dots diminishes. Moreover, the density of the opaque centers of the dots increases from the margins of the opaque portions toward the centers thereof.

Following the clearing operation, the positive is washed and is then ready for the subsequent operations, common in the art, to produce an intaglio printing surface therefrom. These operations include the exposure of the positive to a carbon tissue (a sensitized gelatin film upon a paper backing), and it has been found that a daylight fluorescent light source is particularly well suited for use. Following the exposure, the carbon tissue is transferred to the copper surface, the paper backing stripped, and the tissue developed. The etching of the surface is accomplished by the use of four more or less different strengths of perchloride of iron solutions running from 44 Bé. to 37½ Bé., all in accordance with standard practice.

Referring to the correlated positive hereinafter mentioned, as produced by the bleaching, re-developing and clearing operations, in a typical operation in which the bleaching time was 60 seconds, the re-developing time 45 seconds, and the clearing time 45 seconds, the dot formation was found to be as follows:

A small dot was found to be .002" in diameter and was found to have no opaque center, but to be substantially even in color over its entire area (dot being round in shape).

A dot .003" in diameter showed a slight opacity in the center, the center measuring approximately .001". The center appeared to be heavier in color but definitely not opaque (dot being round in shape).

A dot .00325" in diameter showed a center still heavier in color and opacity and measuring somewhat greater than .001" (dot being round in shape).

A dot .0035" in diameter showed a center that was substantially opaque and measuring approximately .002" (dot being round in shape).

A substantially square dot .005" measured diagonally across the longest dimension showed an opaque center of approximately .004".

Figure 4:
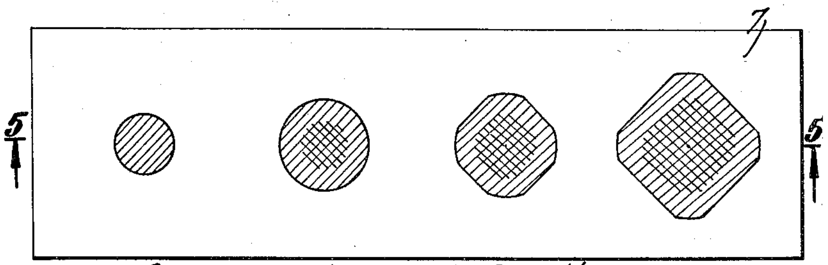
Figure 4 is a plan view, greatly enlarged, of a printing surface made from the correlated positive shown in Figure 3.
Figure 5:
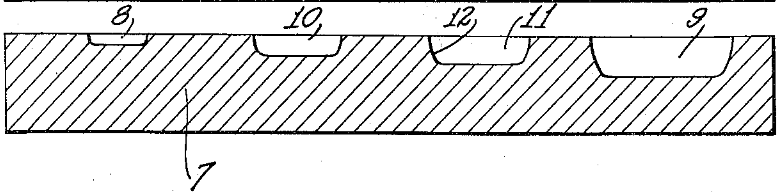
Figure 5 is a view in cross-section taken on the line 5—5 of Figure 4 and looking in the direction of the arrows.

In the drawings, Figures 4 and 5 represent the printing surface formed by the correlated positive shown in Figure 3, and it will be seen that a printing plate 7 is formed with pockets 8, 9, 10, and 11 corresponding, respectively, to the dots 3*a*, 4*a*, 5*a* and 6*a*. These pockets vary in area in accordance with the respective dots and also vary in depth in accordance with the area of the dots and particularly, in accordance with the areas of the opaque centers thereof. The smallest pocket 8 is shallowest, because the carbon tissue was hardened by the relatively great amount of light passing through the colored dot 3*a* and thus held back the etching so that the pocket 8 is not only small in area but relatively shallow.

The pocket 9 corresponding to the dot 4*a* is not only of relatively great area but of great depth, because the opaque center prevented any hardening of the gelatin and thus permitted the etching medium to attack and etch the printing surface to a relatively great extent. The varying sized opaque centers of the dots 5*a* and 6*a* produced corresponding variations in the depth of etching of the respective pockets 10 and 11.

An important characteristic of this invention resides in the fact that the colored fringe formed about the opaque dots facilitates the rounding of the walls of the pockets as illustrated at 12 in Figure 5. This is because some light gets through the colored fringe portion about the dots having opaque centers, and that light serves to cause the carbon tissue to hold back the etching adjacent the rims of the pockets. As a result, the pockets forming the printing surface more readily receive and release the ink during the printing operation and thus become effectively clean after each printed impression so that a more uniform volume of ink is applied to the paper at each impression.

A further important aspect of the invention lies in the fact that the operations of bleaching, re-developing and clearing are all done in bright light and are thus easily observed and controlled.

I claim:

1. The method of making a positive for use in the preparation of an intaglio printing surface, comprising the steps of forming a screened positive transparency of the subject to be reproduced, said positive having thereon the image of the original subject in the form of dots varying in size in accordance with the varying tones of the original subject and composed of silver granules, subjecting said positive transparency to a silver bleach for a time sufficient to bleach completely only the relatively small dots thereon and completely bleach only the peripheral fringes of the larger dots thereon, and re-developing said positive transparency with a color forming developer to impart a color characteristic of said developer to the bleached areas of said dots.

2. The method of making a positive for use in the preparation of an intaglio printing surface, comprising the steps of forming a screened positive transparency of the subject to be reproduced, said positive having thereon the image of the original subject in the form of dots varying in size in accordance with the varying tones of the original subject and composed of silver granules, subjecting said positive transparency to a silver bleach for a time sufficient to bleach completely only the relatively small dots thereon and completely bleach only the peripheral fringes of the larger dots thereon while leaving the center portions of said relatively large dots opaque, and re-developing said positive transparency with a color forming developer to impart a color characteristic of said developer to the bleached areas of said dots.

3. The method of making a positive for use in the preparation of an intaglio printing surface, comprising the steps of forming a screened positive transparency of the subject to be reproduced, said positive having thereon the image of the original subject in the form of dots varying in size in accordance with the varying tones of the original subject and composed of silver granules, subjecting said positive transparency to a silver bleach for a time sufficient to bleach completely only the relatively small dots thereon and completely bleach only the peripheral fringes of the larger dots thereon, re-developing said positive transparency with a color forming developer to impart a color characteristic of said developer to the bleached areas of said dots, and subjecting said positive transparency to a reducing agent for such time until all traces of metallic silver appearing in the colored areas of said dots are removed.

4. The method of making a positive for use in the preparation of an intaglio printing surface, comprising the steps of forming a screened positive transparency of the subject to be reproduced, said positive having thereon the image of the original subject in the form of dots varying in size in accordance with the varying tones of the original subject and composed of silver granules, subjecting said positive transparency to a silver bleach for a time sufficient to bleach completely only the relatively small dots thereon and completely bleach only the peripheral fringes of the larger dots thereon, and re-developing said positive transparency with a color forming developer to impart a color characteristic of said developer to the bleached areas of said dots, said re-developing being continued until said bleached areas of the dots are of a color density less than the density of the centers of said larger dots.

5. The method of making a positive for use in the preparation of an intaglio printing surface, comprising the steps of forming a screened positive transparency of the subject to be reproduced, said positive having thereon the image of the original subject in the form of dots varying in size in accordance with the varying tones of the original subject and composed of silver granules, subjecting said positive transparency to a silver bleach for a time sufficient to bleach completely only the relatively small dots thereon and completely bleach only the peripheral fringes of the larger dots thereon, re-developing said positive transparency with a color forming developer to impart a color characteristic of said developer to the bleached areas of said dots, said re-developing being continued until said bleached areas of the dots are of a color density less than the density of the centers of said larger dots, and subjecting said positive transparency to a reducing agent for such time until all traces of metallic silver appearing in the bleached and re-developed areas of said dots are removed.

6. The method of making a positive for use in the preparation of an intaglio printing surface, comprising the steps of forming a screened positive transparency of the subject to be reproduced, said positive having thereon the image of the original subject in the form of dots varying in size in accordance with the varying tones of the original subject and composed of silver granules, the largest of said dots being practically unconnected, subjecting said positive transparency to a silver bleach for a time sufficient to bleach completely only the relatively small dots thereon and completely bleach only the peripheral fringes of the larger dots thereon, and re-developing said positive transparency with a color forming developer to impart a color characteristic of said developer to the bleached areas of said dots.

7. The method of making a positive for use in the preparation of an intaglio printing surface, comprising the steps of forming a screened positive transparency of the subject to be reproduced, said positive having thereon the image of the original subject in substantially disconnected and opaque dots of silver granules, said opaque dots varying in size in accordance with the varying tones of the original subject, subjecting said positive transparency to a silver bleach for a time sufficient to bleach completely only the relatively small dots thereon and completely bleach only the peripheral fringe of the larger dots thereon, re-developing said positive transparency with a magenta re-developer to impart a magenta color to the bleached areas of said dots.

8. A positive half-tone transparency of a subject adapted for use in the preparation of an intaglio printing surface, said transparency depicting the tones of the subject by dots varying in size in accordance with the varying tones of the subject, the larger of said dots having opaque silver grain centers and transparent colored peripheral fringes surrounded by a field consisting of a colorless transparent area.

9. A positive half-tone transparency of a subject adapted for use in the preparation of an intaglio printing surface, said transparency depicting the tones of the subject by dots varying in size in accordance with the varying tones of the subject, the smallest dots in the highlight areas being completely colored and transparent and the larger of said dots having opaque silver grain centers and transparent colored peripheral fringes, all of said dots being surrounded by a field consisting of a colorless transparent area.

10. A positive half-tone transparency of a subject adapted for use in the preparation of an intaglio printing surface, said transparency depicting the tones of the subject by dots varying in size in accordance with the varying tones of the subject, the smallest dots in the highlight areas being completely colored and transparent and the larger of said dots having opaque silver grain centers and transparent colored peripheral fringes, the opaque centers increasing in size as the size of the dots increases, all of said dots being surrounded by a field consisting of a colorless transparent area.

11. A positive half-tone transparency of a subject adapted for use in the preparation of an intaglio printing surface, said transparency depicting the tones of the subject by dots varying in size in accordance with the varying tones of the subject, the largest of said dots being practically unconnected, and the smallest dots in the highlight areas being completely colored and transparent and the larger of said dots having opaque silver grain centers and transparent colored peripheral fringes, all of said dots being surrounded by a field consisting of a colorless transparent area.

12. A positive half-tone transparency of a subject adapted for use in the preparation of an intaglio printing surface, said transparency depicting the tones of the subject by completely unconnected dots varying in size in accordance with the varying tones of the subject, the larger dots having opaque silver grain centers and relatively transparent magenta peripheral fringes, all of said dots being surrounded by a field consisting of a colorless transparent area.

13. A positive half-tone transparency of a subject adapted for use in the preparation of an intaglio printing surface, said transparency depicting the tones of the subject by completely unconnected dots varying in size in accordance with the varying tones of the subject, the larger of said dots having opaque silver grain centers and relatively transparent magenta peripheral fringes, and the smaller dots in the highlight areas being relatively transparent and completely magenta in color, all of said dots being surrounded by a field consisting of a colorless transparent area.

WILLIAM M. DEVERS.

REFERENCES CITED

The following references are of record in the file of this patent:

UNITED STATES PATENTS

| Number | Name | Date |
|---|---|---|
| 1,773,887 | Stirling | Aug. 26, 1930 |
| 1,948,604 | Weil | Feb. 27, 1934 |
| 2,061,688 | Wilmanns | Nov. 24, 1936 |
| 2,096,794 | Dultgen | Oct. 26, 1937 |
| 2,155,458 | Wilkinson | Apr. 25, 1939 |
| 2,226,086 | Wilkinson | Dec. 24, 1940 |
| 2,331,772 | Gibson | Oct. 12, 1943 |
| 2,446,193 | Rice | Aug. 3, 1948 |

FOREIGN PATENTS

| Number | Country | Date |
|---|---|---|
| 274,422 | Great Britain | June 14, 1928 |
| 593,839 | Germany | Mar. 6, 1934 |